United States Patent [19]
Clark

[11] 3,951,504
[45] Apr. 20, 1976

[54] ELECTRICAL CABLE STRESS TRANSFER DEVICE

[75] Inventor: John Clark, Willow Spring, Ill.

[73] Assignee: I-T-E Imperial Corporation, East Farmingdale

[22] Filed: Apr. 29, 1975

[21] Appl. No.: 572,717

[52] U.S. Cl. .............................. 339/103 R; 339/104
[51] Int. Cl.² ......................................... H01R 13/58
[58] Field of Search ..................... 339/103, 104, 107

[56] References Cited
UNITED STATES PATENTS

| | | | |
|---|---|---|---|
| 1,979,756 | 11/1934 | McNamee et al. | 339/104 X |
| 2,913,791 | 11/1959 | Martin | 339/103 R |

*Primary Examiner*—Roy Lake
*Assistant Examiner*—DeWalden W. Jones
*Attorney, Agent, or Firm*—Howard C. Miskin

[57] ABSTRACT

A device for transferring the pull on an electrical cable to an anchor point includes a clamp having a cable engaging collar with a tapered bore engaged by a wedge whose advance clamps the cable. The collar is connected by a chain or plastic extension member to an annulus which is locked to an anchoring surface by being clamped between the male and female sections of a screw coupling associated with the cable, the extension member is shorter than the cable between the collar and anchoring point and the collar and wedge may be joined by an integrally formed flexible strap.

9 Claims, 6 Drawing Figures

ELECTRICAL CABLE STRESS TRANSFER DEVICE

BACKGROUND OF THE INVENTION

The present invention relates generally to improvements in electrical cord stress relief or transfer devices and it relates more particularly to an improved device for transferring the pull on an electrical cord from the coupled or connected end thereof to a suitable anchorage.

A most common point of mechanical failure in the distribution of electrical current generally occurs in the area of connection between the external electric cord or cable, extending from the electrically energized apparatus or device and the electrical outlet or coupling. As used herein, electric cord will be used but understood to include cable. A pull or stress is frequently applied to the electrical cord, such as with an external operating control unit, or the control cable, and when such pull or stress is excessive, it results in breaking of or damage to the electrical connection or coupling. Many strain relief or stress transfer devices have been heretofore proposed for electrical cords but these possess numerous drawbacks and disadvantages. They are generally unreliable, expensive and complicated devices which are difficult to apply and are of little versatility and adaptability and otherwise leave much to be desired.

SUMMARY OF THE INVENTION

It is a principal object of the present invention to provide an improved electrical cord or cable strain relief device.

Another object of the present invention is to provide an improved device to transfer the pull or stress along an electrical cord to an anchorage thereby to relieve the strain at the proximal end of the electrical cord.

A further object of the present invention is to provide an improved strain relief device which is positive acting and increases the locking effect during pull along the cord.

Still another object of the present invention is to provide a device of the above nature characterized in its high reliability, ruggedness, simplicity, low cost, ease of application and great versatility and adaptability.

In a sense the present invention contemplates the provision of an improved device for transferring the pull or stress on a cable or electrical cord to an anchor point comprising a cable clamp including an elongated collar with a longitudinal bore having forwardly converging opposing first and second side faces and a wedge member longitudinally slidably registering with the collar bore and having opposite forwardly converging first and second wedge faces. The first wedge face engaging the first bore side face and the second wedge face confronting and laterally spaced from the second bore side face, an elongated connector member joined at its distal end to the collar member, and means for securing the proximal end of the connector member to the anchor point.

In the preferred form of the improved stress transfer device the anchor securing means comprises an annulus and connector member joining the annulus to the collar is a pair of laterally spaced chains or a plastic web integrally formed with the annulus and collar. The device may be formed as an integral unit of a synthetic organic polymeric resin with the wedge and collar members being joined by a self formed flexible strap. The wedge and collar engaging first faces are serrated to form mating ratchet teeth which permit the forward movement and prevent the rear movement of the wedge in the collar bore.

The improved electrical cable stress transfer device is simple, rugged, reliable and of low cost, easy to apply and of great versatility and adaptability.

DESCRIPTION OF THE PREFERRED EMBODIMENTS

Figure 1:
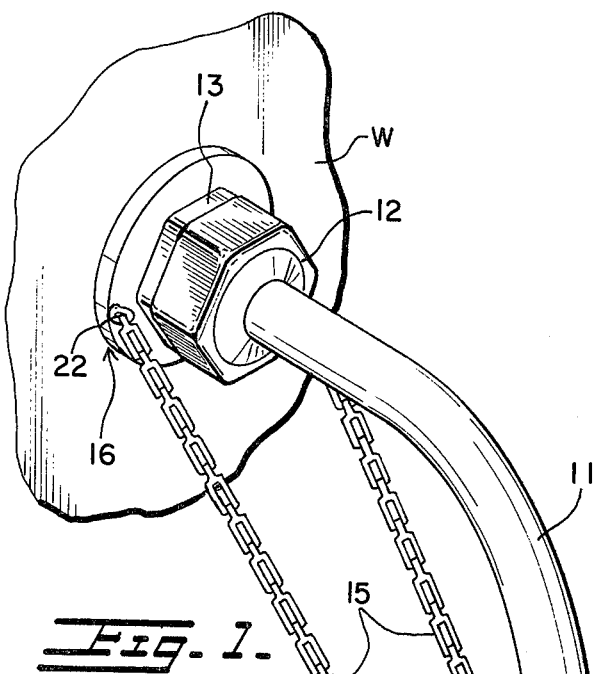
FIG. 1 is a front perspective view of a preferred embodiment of the present invention illustrated as applied to an electrical drop cable extending from an electrical wall fitting.
Figure 2:
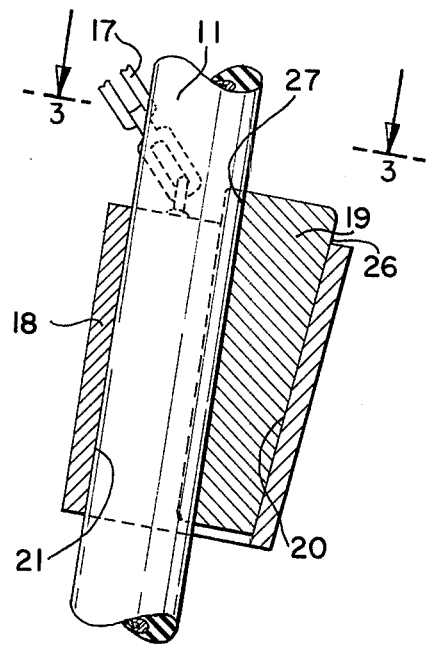
FIG. 2 is a sectional view taken along line 2—2 in FIG. 1.
Figure 3:
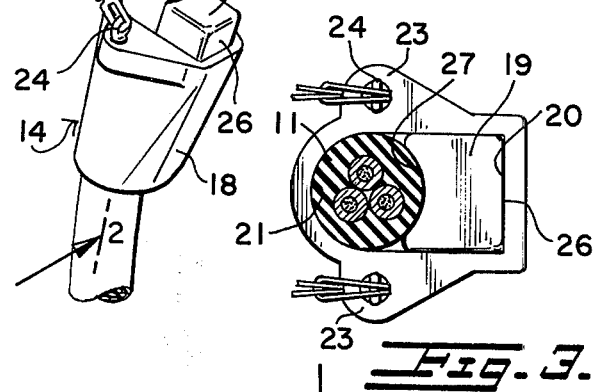
FIG. 3 is a sectional view taken along line 3—3 in FIG. 2.

Referring now to the drawings, particularly FIGS. 1–3 thereof, which illustrate a preferred embodiment of the present invention, the reference numeral 10 generally designates the improved electrical cable stress transfer device which is illustrated as applied to an electrical cord or cable 11 shown as of the three conductor type enclosed in an elastomeric compressible outer sheath. The cable 11 extends from a wall W at which it is connected to ground and the electrical source by way of a coupling member 12 of known construction, a hex nut 13 being provided which engages an externally threaded tubular member projecting through the wall W.

The stress transfer device 10 comprises a cable clamp member 14 formed of any suitable material, an anchoring member 16 shown as an annulus or disc, and interconnecting means or connecting members 17. The clamp member 14 includes a longitudinally extending collar 18 having a bore longitudinally extending therethrough and a wedge 19 longitudinally slidably registering with the bore in the collar 18. The longitudinal bore in collar 18 is of laterally elongated transverse cross section and includes forwardly converging first and second side faces 20 and 21 respectively, the first side face 20 extending along a substantially flat plane and the second side face 21 being of concave cylindrical configuration substantially complementing the outside face of the cable 11.

The anchoring member 16 is in the form of a flat annulus provided with laterally opposite eye members 22. The connector members 17 are a pair of link chains 15 connected at their proximal ends to respective eye members 22. Integrally formed with and projecting outwardly from the opposite proximal ends of the collar 18 are a pair of wings having apertures therein which are anchored by the shanks of suitable eye members 24. The distal ends of the chains 15 which are of equal lengths are connected to perspective eye members 24.

The wedge member 19 includes forwardly converging opposite first and second wedge faces 26 and 27 respectively, the convergence angle of the wedge faces 26 and 27 being the same as that of the bore side faces 20 and 21. The first wedge face 26 mates and engages the first side face 20 and the second wedge face 27 is of concave cylindrical shape and is coaxial with and confronts the second bore face 21.

In the application of the improved stress transfer device the cable 11 which is electrically connected to connectors behind wall W is passed through the collar 18 and the anchoring member 16 is firmly secured to the wall W by mounting it on the threaded tubular member projecting through the wall W as earlier explained, and tightly clamping it to the wall W by means of the hex nut 13. The collar 18 is slid along the electrical cable 11 while the cable proximal end is in its firm coupled position to a point where the length of the cable 11 between the annulus 16 and the collar 18 exceeds the length of each chain 17 and the wedge 19 is then inserted in the collar bore in the relationship described and is pushed forwardly to effect a tight clamping of the collar 18 to the cable 11. Any pull on the cable 11 forward of the clamp member 14 in the direction of the arrow in FIG. 2 is transferred by the chains 17 to the annulus 16 thus restraining such pull from reaching the cable connection, not shown, and further, such pull tends to advance the wedge 19 forwardly to tighten the clamping member 14 to the cable 11 and fixedly grip and hold cable 11.

Figure 5:
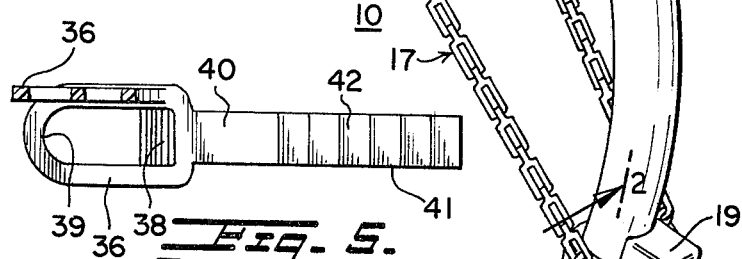
FIG. 5 is a sectional view taken along line 5—5 in FIG. 4.
Figure 4:
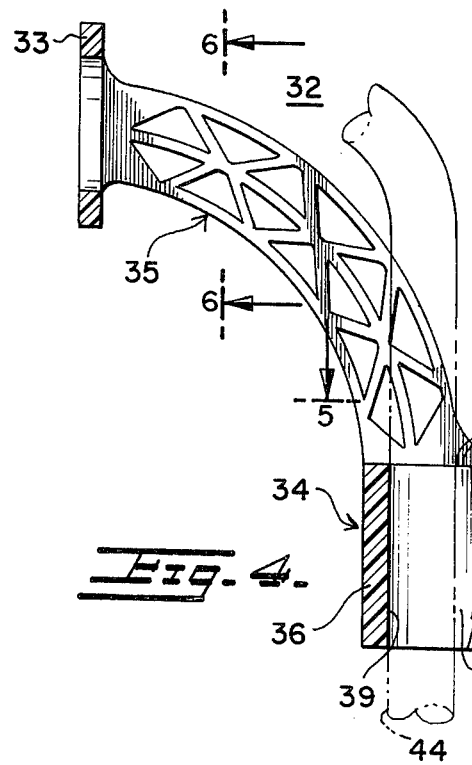
FIG. 4 is a medial longitudinal sectional view of another embodiment of the present invention.
Figure 6:
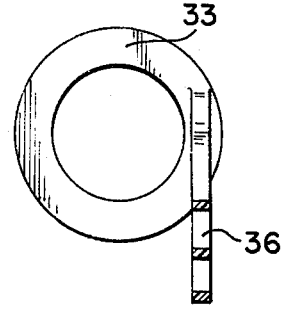
FIG. 6 is a sectional view taken along line 6—6 in FIG. 4.

On FIGS. 4–6 of the drawings, there is illustrated another embodiment of the present invention, which differs from that first described primarily in that the modified stress transfer device 32 is integrally formed as a unit from a synthetic organic polymeric resin such as a polyolefin, for example, polyethylene, polypropylene or the like.

Specifically, the device 32 includes a mounting annulus 33, a cable clamp section 34 and an elongated connector section 35. The clamp section 34 comprises a collar 36 having a laterally elongated longitudinal bore 37 provided with laterally spaced opposite forwardly converging first and second side faces 38 and 39 respectively. The first side face 38 lies in a flat plane and is inclined to the collar longitudinal axis and is serrated to provide ratchet teeth and the second side face 39 is of concave cylindrical configuration generally parallel to the collar longitudinal axis.

Joined to the proximal side edge of the collar 36 proximate the side face 38 by an elongated, integrally formed flexible strap 40 is a wedge member 41 having opposite outwardly or forwardly converging first and second wedge faces 42 and 43 respectively. The first wedge face 42 is serrated to provide ratchet teeth complementing those of the first side face 38 of collar 36 and the second wedge face 43 having a concave longitudinally cylindrical face, the angle of convergence of the web faces 42 and 43 being generally the same as that of the bore side faces 38 and 39. In use the wedge 41 registers with the bore 37 and the first wedge face 42 engages the first side face 38 of bore 37 to prevent the rearward movement of the wedge 41.

The connector section 35 extends acruately from a side border of the annulus 33 to the elongated proximal end border of the collar 36 being integrally formed with the annulus 33 and collar 36. The connector section 35 is a flat web of upwardly convex arcuate configuration and is flexible and normally lies in a vertical plane. The connector section 35 is apertured as shown, to provide a triangulated structural configuration of high strength of weight ratio with some stretch.

The stress transfer device 32 last described in similar in its application and operation to that of the stress transfer device 10 first described.

Strap 40 allows the wedge to be readily available for use in the field without possibility of losing, dropping or misplacing the wedge 41. Further, the resilience of strap 40 when wedge 41 is operatively positioned urges wedge 41 in a clockwise direction as shown in FIG. 4 to provide a positive wedging and locking force on the cable 44, shown in phantom in FIG. 4.

If desired, wedge 19 can be integrally connected to the collar 18 of the first described embodiment by a strap in a manner similar to that described in connection with cable clamp 34.

Also, while a chain and eyebolt members were illustrated as being used for anchoring the strain relieving member, other anchoring means may be employed.

While there have been described and illustrated preferred embodiments of the present invention, it is apparent that numerous alterations, omissions and additions may be made without departing from the spirit thereof.

What is claimed is:

1. A device for transferring the pull on a cable to an anchor point comprising a cable clamp including an elongated collar member with a longitudinal bore having forwardly converging opposing first and second side faces and a wedge member longitudinally slidably registering with said bore and having opposite forwardly converging first and second wedge faces, said first wedge face engaging said first side face and said second wedge face confronting and laterally spaced from said second side face, an elongated connector member joined at its distal end to said collar member and means for securing the proximal end of said connector member to said anchor point.

2. The cable pull transfer device of claim 1 wherein said second side face and said second wedge face are parallel.

3. The cable pull transfer device of claim 2 wherein said second side face and second wedge face are of circular cylindrical configuration.

4. The cable pull transfer device of claim 1 wherein said first side face and said first wedge face are longitudinally serrated to provide mutually engaged mating ratchet surfaces permitting the forward advance of said wedge member in said bore and restricting the rearward movement thereof.

5. The cable pull transfer device of claim 1 including a flexible member interconnecting the rear portions of said collar and wedge members.

6. The cable pull transfer device of claim 5 wherein said flexible member, collar and wedge member are integrally formed of a synthetic organic polymeric resin.

7. The cable pull transfer device of claim 1 wherein said anchor securing means comprises an annular member.

8. The cable pull transfer device of claim 7 wherein said connector member comprises a chain.

9. The cable pull transfer device of claim 7 wherein said connector member, annular member and said collar are integrally formed of a synthetic organic polymeric resin.

* * * * *